(12) United States Patent
Gillen et al.

(10) Patent No.: US 6,876,897 B2
(45) Date of Patent: Apr. 5, 2005

(54) POSITIONING DEVICE AND METHOD FOR OPERATION

(75) Inventors: John H. Gillen, Ottawa Lake, MI (US); Douglas G. Burwell, Perrysburg, OH (US); George Bukovinszky, Waterville, OH (US); Mark E. Cargill, Adrian, MI (US)

(73) Assignee: Pilkington North America, Inc., Toledo, OH (US)

( * ) Notice: Subject to any disclaimer, the term of this patent is extended or adjusted under 35 U.S.C. 154(b) by 0 days.

(21) Appl. No.: 10/228,537

(22) Filed: Aug. 27, 2002

(65) Prior Publication Data

US 2004/0044430 A1 Mar. 4, 2004

(51) Int. Cl.[7] .............................. G06F 19/00; B25J 9/00
(52) U.S. Cl. ........................ 700/114; 700/192; 414/783
(58) Field of Search ............................ 700/57–60, 114, 700/264, 192; 269/303; 414/783

(56) References Cited

U.S. PATENT DOCUMENTS

| | | | | |
|---|---|---|---|---|
| 4,297,927 A | * | 11/1981 | Kuroda | 83/36 |
| 4,369,872 A | * | 1/1983 | Sticht | 198/345.3 |
| 4,709,605 A | * | 12/1987 | Clark | 83/23 |
| 4,909,869 A | * | 3/1990 | Sakamoto et al. | 156/64 |
| 4,929,892 A | * | 5/1990 | Larsen | 324/754 |
| 4,946,149 A | * | 8/1990 | Greene | 269/21 |
| 5,169,280 A | * | 12/1992 | Favre | 414/737 |
| 5,411,362 A | * | 5/1995 | Neri et al. | 414/796.9 |
| 5,552,194 A | * | 9/1996 | Ito et al. | 428/31 |
| 5,607,313 A | * | 3/1997 | Nyman | 439/83 |
| 6,330,495 B1 | * | 12/2001 | Kaneko et al. | 700/264 |
| 6,461,100 B1 | * | 10/2002 | Eisenzimmer et al. | 414/754 |
| 6,471,774 B1 | * | 10/2002 | Krueger | 118/264 |
| 6,580,956 B1 | * | 6/2003 | Sargent et al. | 700/114 |
| 6,675,541 B2 | * | 1/2004 | Mackey | 52/208 |

* cited by examiner

Primary Examiner—Leo Picard
Assistant Examiner—Elliot Frank
(74) Attorney, Agent, or Firm—Marshall & Melhorn, LLC

(57) ABSTRACT

A positioning device precisely positions a work piece at a workstation. Precise positioning is accomplished through the use of a tool controller, a programmed mechanism, and a minimal pneumatic circuit. Pre-programming of the tool controller results in initially locating the work piece, precisely positioning the workpiece at the workstation, and then locking-in the position of the workpiece at the workstation time-after-time. A method for operating the positioning device is also disclosed.

21 Claims, 4 Drawing Sheets

POSITIONING DEVICE AND METHOD FOR OPERATION

BACKGROUND OF THE INVENTION

The present invention relates generally to devices for positioning a work piece at a workstation and, more particularly, to positioning devices for precisely positioning a work piece, for example, a glass or plastic sheet, at a plurality of workstations through the use of a positioning device. A method for operating such a positioning device is also disclosed.

Currently, under the control of a positioning device, a work piece is re-positioned at each of several workstations so that operations can be performed on the work piece. Subsequently, the work piece is moved to additional workstations where a plurality of operations is to be performed. Typically, it is desired to position the work piece within a given positioning tolerance so that the operations performed on the work piece are reasonably accurate.

To accomplish precise positioning of the work piece at the workstation, it is necessary that the positioning device and associated locating equipment utilize several sensors along with much wiring and much processor computational resources and activity. Recently, however, work piece positioning and locating equipment has become very precise in the positioning of a work piece, but still require the use of several sensors, and rather significant wiring and computational resources and activity. Thus, those skilled in the art continued to seek a solution to the problem of how to provide a better precision positioning device.

SUMMARY OF THE INVENTION

The present invention relates to precision positioning of a work piece at a workstation and, optionally, subsequently at a plurality of other workstations. Central to the approach taken by the present invention is pre-programming a tool controller that controls a programmed mechanism for locating, moving, and precision positioning of a work piece at a workstation.

The programmed mechanism comprises at least one mounting structure where an actuator, at least one fluid cylinder having a cylinder rod lock, a vacuum generator, and at least one vacuum cup are disposed. The actuator, fluid cylinder with cylinder rod lock, vacuum generator, and vacuum cup are linked together to comprise a fluid circuit.

As a result of pre-programming, the tool controller moves the programmed mechanism toward the initial workstation so as to locate the work piece while commanding the fluid cylinder to move to an initial position. Upon reaching the work piece, the actuator senses the work piece and causes the vacuum generator to draw a vacuum in the vacuum cup, which in turn produces attachable contact between the vacuum cup and the work piece. As so embodied in the present invention, the actuator is the only sensor that is required.

Next, the tool controller signals the programmed mechanism, with the attached work piece, to move to the workstation where an operation is to be performed on the work piece. Upon approaching the workstation, where at least one locating stop is disposed nearby, the tool controller commands the fluid cylinder to be depressurized, thus allowing the work piece to abut the locating stop. This results in precise positioning of the work piece at the workstation. Subsequently, the tool controller commands the cylinder rod lock, which is disposed within the fluid cylinder, to lock the fluid cylinder in the precise position for the work piece at the workstation.

These positioning functions result in the work piece being precisely positioned at the workstation time-after-time, for the life of that operation, at the workstation and cause that precise position to be maintained while the work piece remains at the workstation. Pre-programming of the tool controller and the precise positioning capabilities of the programmed mechanism, the locating stop, the fluid cylinder, and the rod lock require little or no wiring and minimal computational resources and activity. Further, these positioning functions may be repeated for additional workstations, as required.

Various objects and advantages of this invention will become apparent to those skilled in the art from the following detailed description of a preferred embodiment, when read in light of the accompanying drawings.

DESCRIPTION OF THE PREFERRED EMBODIMENT

Figure 1:
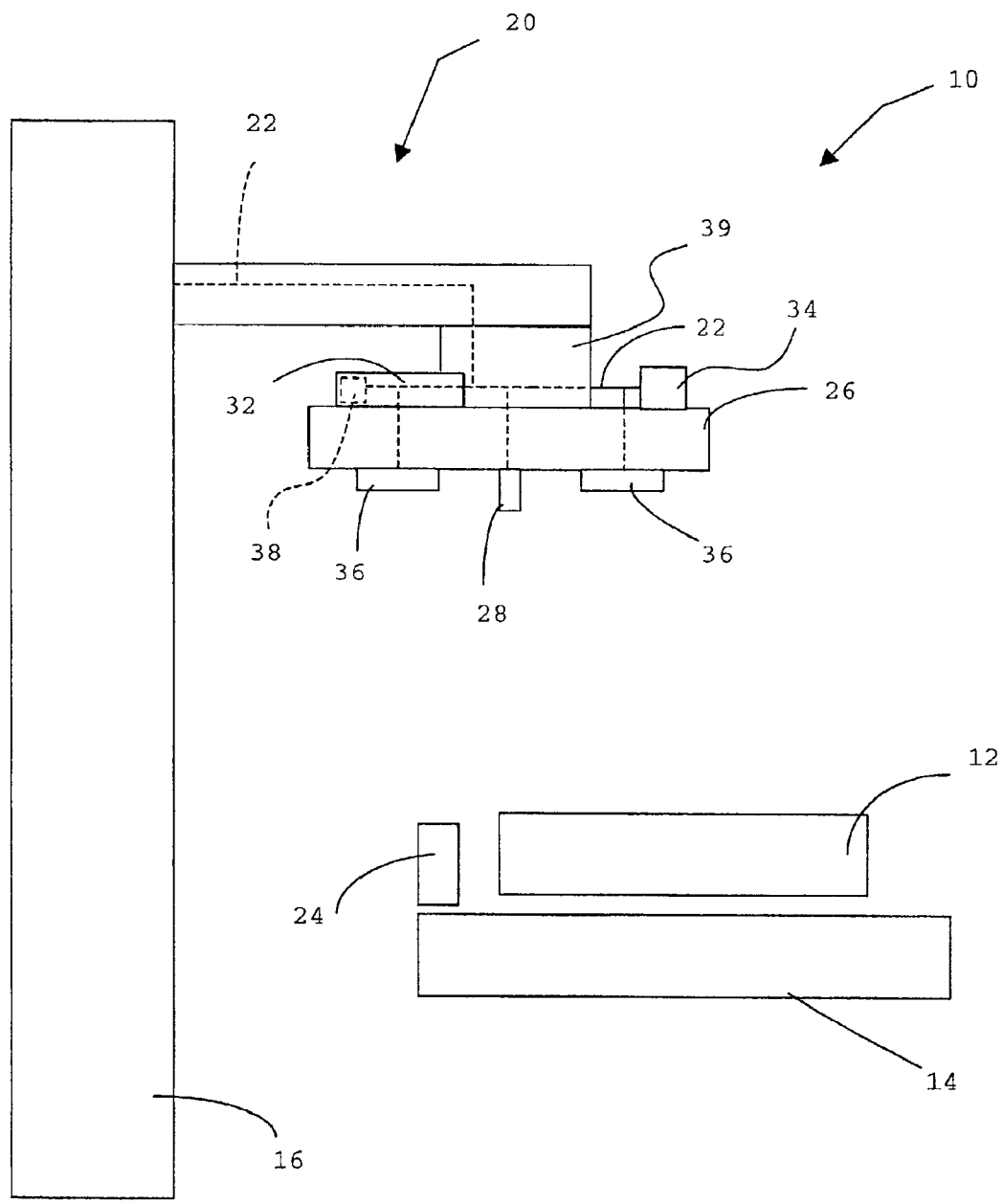
FIG. 1 is a diagrammatic view of a positioning device in accordance with the present invention and an associated work piece.

Referring now to FIG. 1, there is shown a positioning device 10 for performing precision positioning of a work piece 12 at a workstation 14 through the use of a tool controller 16 and a programmed mechanism 20.

Examples of the work piece 12 would be an automotive window glass, a vehicle plastic lite or, possibly, a metal sheet. Examples of operations performed at the workstation 14 would be priming an automotive window glass, extruding a profile onto an automotive window glass, or possibly stamping a metal sheet. The tool controller 16 could be a programmable logic controller (PLC), a robot controller, or possibly a personal computer, as examples. Examples of a programmed mechanism 20 would be a robotic arm with associated end-of-arm tooling or conventional automated electro-mechanical tooling known in the art.

Prior to workstation operations being performed on the work piece 12, the programmed mechanism 20 would be semi-automatically taken through the work piece positioning functions. This would be accomplished through the use of "joystick" simulation and/or computer simulation, while the positioning function details would be captured and, consequently, stored in the memory of the tool controller 16.

The following are some of the main positioning device functions that would be performed on a work piece: (1) locating the work piece 12, (2) making attachable contact with the work piece 12, (3) moving the work piece 12 to the destination workstation 14, (4) precisely positioning the work piece 12 at the workstation 14, and (5) locking-in the precise position at the workstation 14, so that workstation operations do not disturb the-precise positioning. The pre-programming and storage of the workstation positioning functions in the tool controller 16 would be repeated for all workstations 14.

As a result, the tool controller 16 would mechanically, electrically, and/or fluidly control the positioning functions of the programmed mechanism 20 by way of a minimal fluid circuit 22, thus requiring minimal computational resources and activity. The programmed mechanism 20 comprises an adapter 39 and at least one mounting structure 26 where an actuator 28, at least one fluid cylinder 32 with attached cylinder rod lock 38, a vacuum generator 34, and at least one vacuum cup 36 would be disposed. The actuator 28, fluid cylinder 32, cylinder rod lock 38, vacuum generator 34, and the vacuum cup 36 are linked together to comprise the fluid circuit 22.

Figure 2:
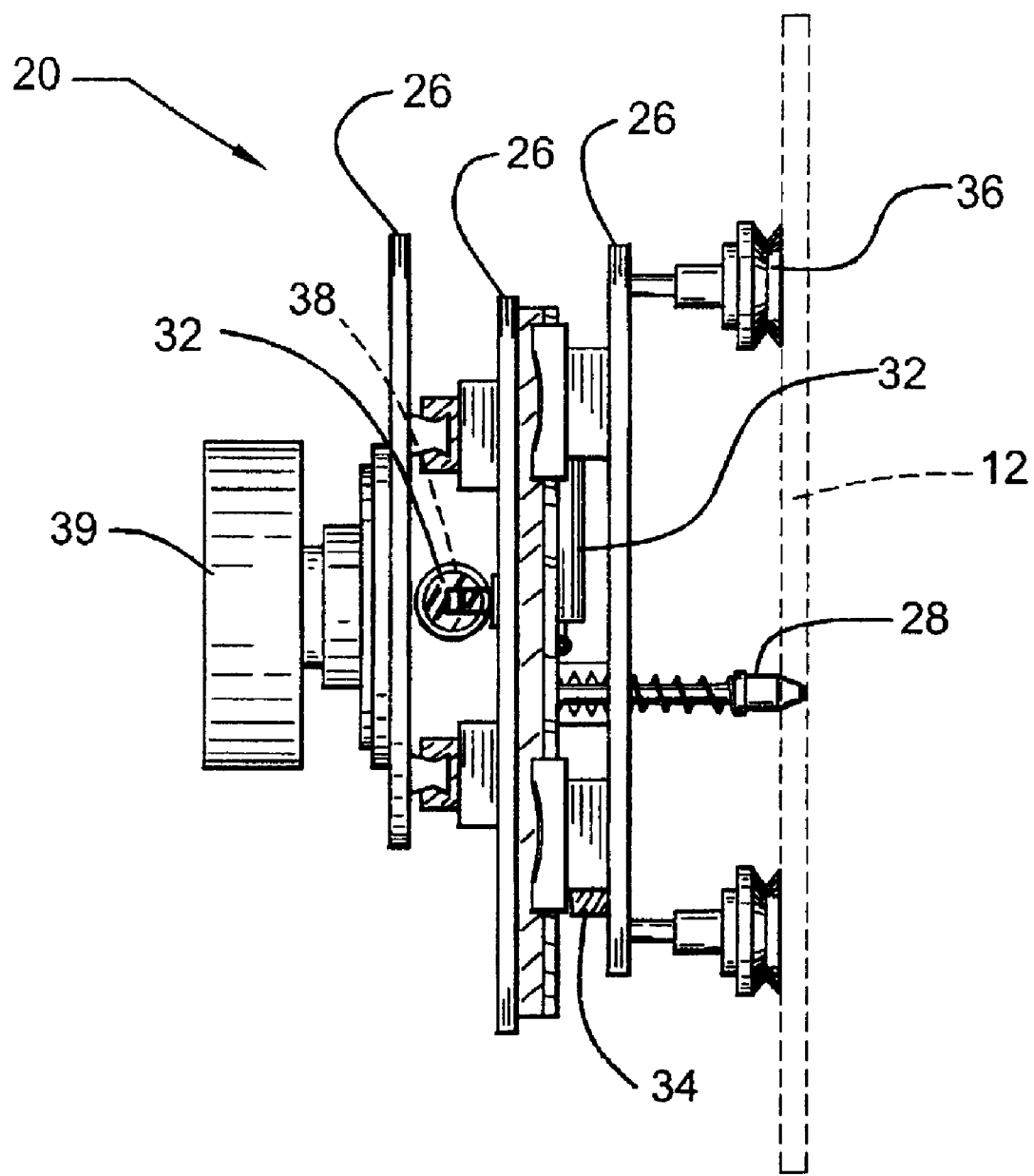
FIG. 2 is a side view of the positioning device in accordance with the present invention.
Figure 3:
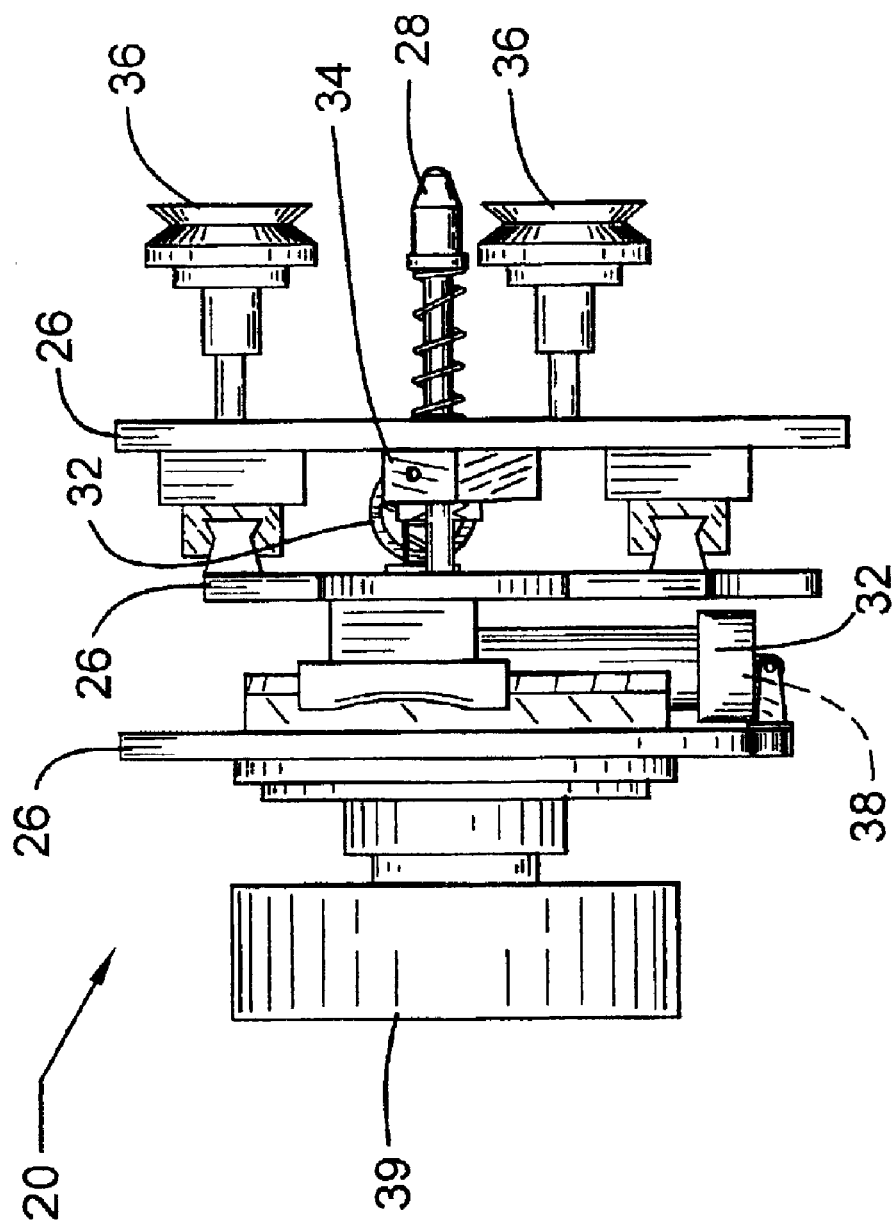
FIG. 3 is a side view of the positioning device at a right angle to the view of FIG. 2.
Figure 4:
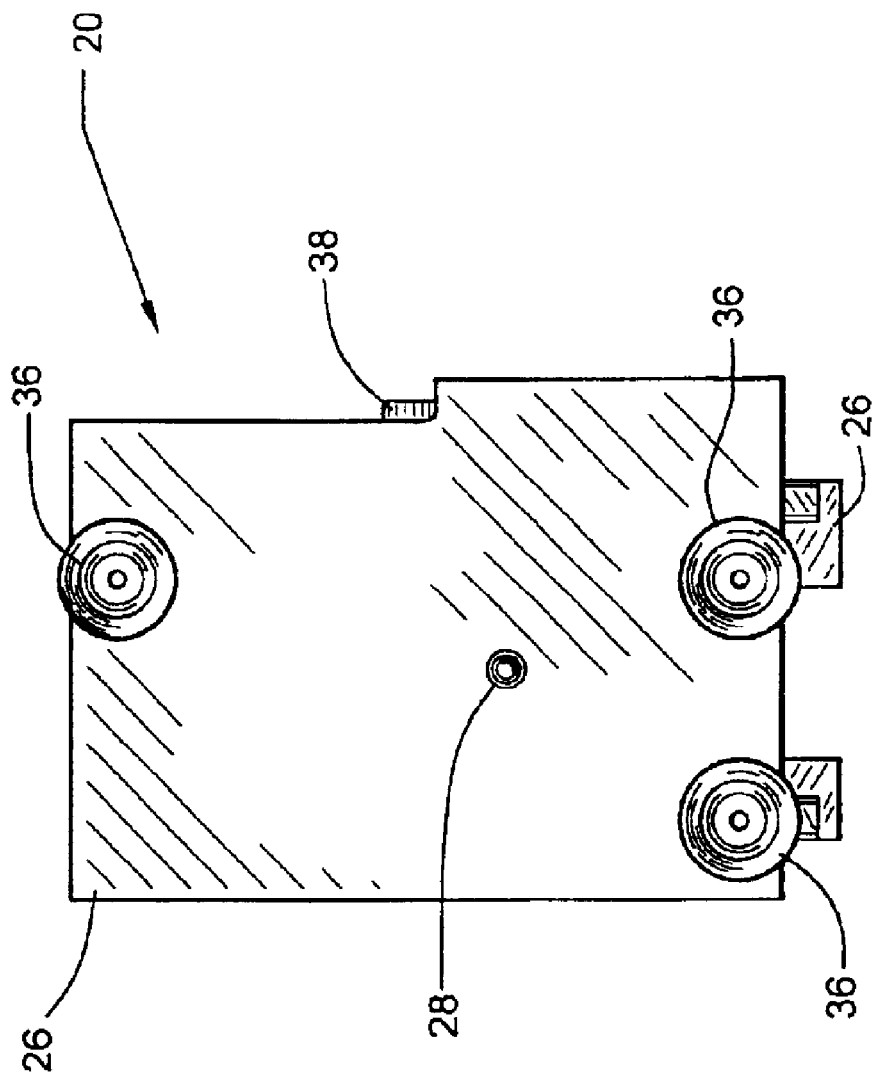
FIG. 4 is a bottom view of the positioning device of FIG. 2.

The adapter 39 could be a collar that mechanically rotatably interfaces the end-of-arm tooling or conventional tooling to the mounting structure 26. In a preferred embodiment that is illustrated in FIGS. 2–4, the mounting structure 26 comprises aluminum plates, and the actuator 28 is a spring-loaded plunger. The fluid cylinders 32 are preferably air cylinders. However, the fluid circuit components may be pneumatic or hydraulic in nature.

The basic functions of the positioning device 10 would have the programmed mechanism 20 move toward and into contact with the work piece 12 while the tool controller 16 is commanding the fluid cylinder 32 to be positioned in an initial position. An example of the initial position would be in the direction toward the initial workstation. Upon reaching the work piece 12, the actuator 28 would be contacted and thus cause the vacuum generator 34 to draw a vacuum in the vacuum cups 36, which in turn would produce attachable contact between the vacuum cups 36 and the work piece 12.

In conjuction with FIGS. 2–4, the tool controller 16 would signal the programmed mechanism 20 to move the work piece 12 toward the workstation 14, where a locating stop 24 would be disposed nearby. As the programmed mechanism 20 approaches the workstation 14, the tool controller 16 would command the fluid cylinder 32 to depressurize, thus causing the work piece 12 to be precisely positioned at the workstation 14, which would be relative to and abutting the locating stop 24. Subsequently, the programmed mechanism 20 would command the rod lock 38, which would be disposed within the fluid cylinder 32, to lock the fluid cylinder 32 in the precise position for the work piece 12, at the workstation 14.

Pre-programming of: (1) precise workstation 14 and locating stop 24 locations, (2) precision control of the fluid cylinder 32, and (3) locking-in of the rod lock 38, result in precisely positioning the work piece 12 at the workstation 14. This precision positioning is accomplished while using the actuator 28 as the only sensor. In addition, the pre-programming, as so described, results in minimal computational resources and activity.

In accordance with the provisions of the patent statutes, the principles and modes of operation of this invention have been described and illustrated in its preferred embodiments. However, it must be understood that the invention may be practiced otherwise than specifically explained and illustrated without departing from its spirit or scope.

What is claimed is:

1. A positioning device for positioning an automotive window glass at a workstation, comprising:
    a tool controller capable of storing automotive window glass positioning functions; and
    a programmed mechanism having the automotive window glass attached thereto and capable of accepting automotive window glass positioning function commands from the tool controller;
    wherein the tool controller commands the programmed mechanism by utilizing only a pre-programmed locating stop position to lock in a position of the automotive window glass upon a surface of a workstation in a relationship that abuts a single locating stop.

2. The positioning device according to claim 1, wherein the automotive window glass positioning functions are initially developed and pre-programmed through joy stick simulation.

3. The positioning device according to claim 1, wherein the automotive window glass positioning functions are initially developed and pre-programmed through computer simulation.

4. The positioning device according to claim 1, wherein the workstation comprises an automotive window glass priming station.

5. The positioning device according to claim 1, wherein a profile is extruded onto the automotive window glass.

6. The positioning device according to claim 1, wherein the tool controller comprises a programmable logic controller.

7. The positioning device according to claim 1, wherein the tool controller comprises a robot controller.

8. The positioning device according to claim 1, wherein the tool controller comprises a personal computer.

9. The positioning device according to claim 1, wherein the programmed mechanism comprises a robotic arm with end-of-arm tooling.

10. The positioning device according to claim 1, wherein the programmed mechanism comprises conventional automated electro-mechanical tooling.

11. The positioning device according to claim 1, wherein the programmed mechanism comprises a mounting structure having at least one aluminum plate.

12. The positioning device according to claim 1, wherein the programmed mechanism comprises an actuator having a spring-loaded plunger.

13. The positioning device according to claim 1, wherein the programmed mechanism comprises a fluid circuit having pneumatic components.

14. The positioning device according to claim 1, wherein the programmed mechanism comprises a fluid circuit having hydraulic fluid components.

15. The positioning device according to claim 1, wherein, subsequently, the programmed mechanism removes the automotive window glass from the workstation surface and the relationship that abuts the locating stop.

16. A method of positioning an automotive window glass a workstation, comprising:
    storing only a pre-programmed locating stop position in a tool controller, the tool controller being capable of commanding a programmed mechanism, which has an automotive window glass attached thereto;
    commanding the programmed mechanism to lock in a position of the automotive window glass upon a surface of the workstation in a relationship that abuts a single locating stop, by utilizing the pre-programmed locating stop position; and
    removing the automotive window glass from the workstation surface and the relationship that abuts the locating stop.

17. The method as defined in claim 16, wherein the programmed mechanism comprises at least one mounting structure whereon an actuator, at least one fluid cylinder with a cylinder rod lock, a vacuum generator, and at least one vacuum cup are disposed.

18. The method as defined in claim 17, further comprising commanding the programmed mechanism to move toward an initial workstation that is accompanied by moving the cylinder into an initial position.

19. The method as defined in claim 16, wherein the automotive window glass is attached to a vacuum cup.

20. The method as defined in claim 16, wherein a rod lock is commanded to lock in the positioning of the automotive window glass in the relationship that abuts the locating stop.

21. The method of claim 16, further comprising priming the automotive window glass or extruding a profile onto the automotive window glass.

* * * * *

UNITED STATES PATENT AND TRADEMARK OFFICE
CERTIFICATE OF CORRECTION

PATENT NO. : 6,876,897 B2
DATED : April 5, 2005
INVENTOR(S) : Gillen et al.

It is certified that error appears in the above-identified patent and that said Letters Patent is hereby corrected as shown below:

<u>Column 4,</u>
Lines 51 and 52, read "A method of positioning an automotive window glass a workstation, comprising:" should read -- A method of positioning an automotive window glass at a workstation, comprising: --.

Signed and Sealed this

Seventh Day of June, 2005

JON W. DUDAS
*Director of the United States Patent and Trademark Office*